March 4, 1952  S. W. LIPPITT  2,588,132
MACHINE FOR THE MANUFACTURE OF FIBER FOOTWEAR
Filed June 17, 1947  14 Sheets-Sheet 1
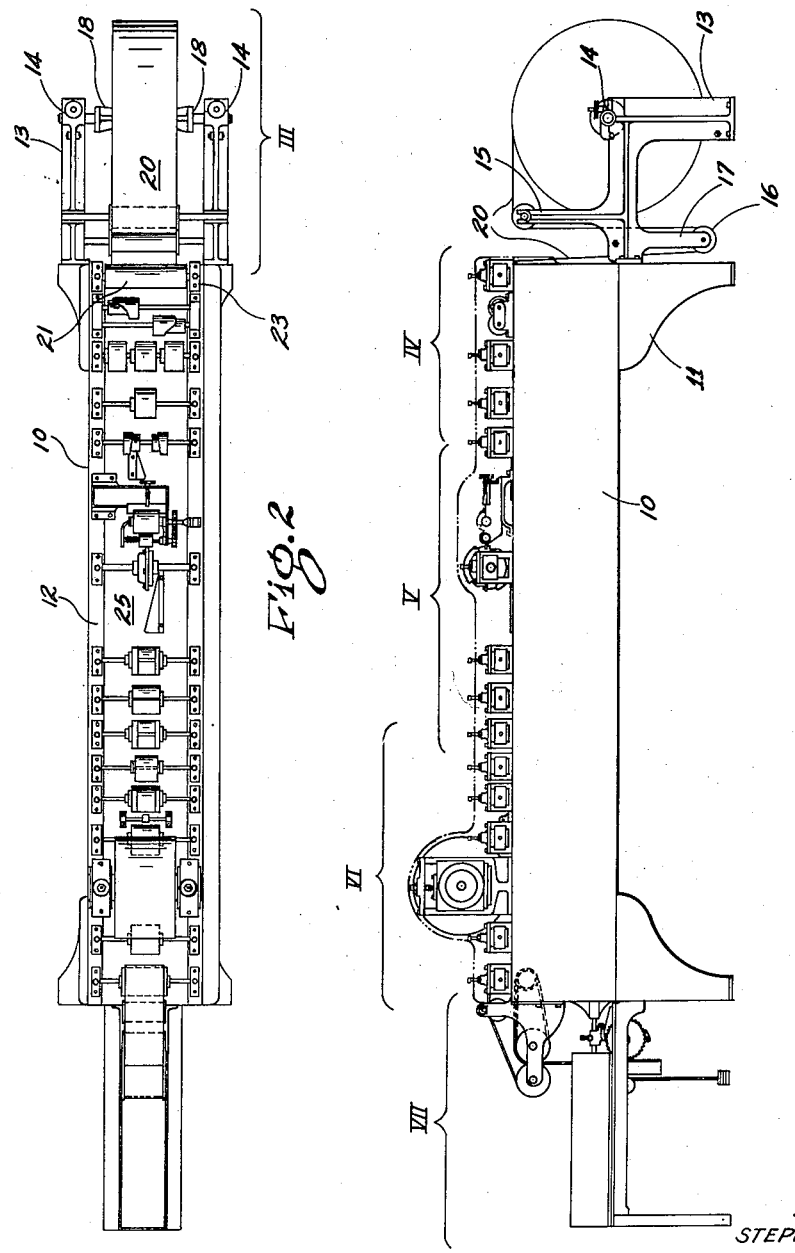
INVENTOR.
STEPHEN W. LIPPITT
BY
ATTORNEYS

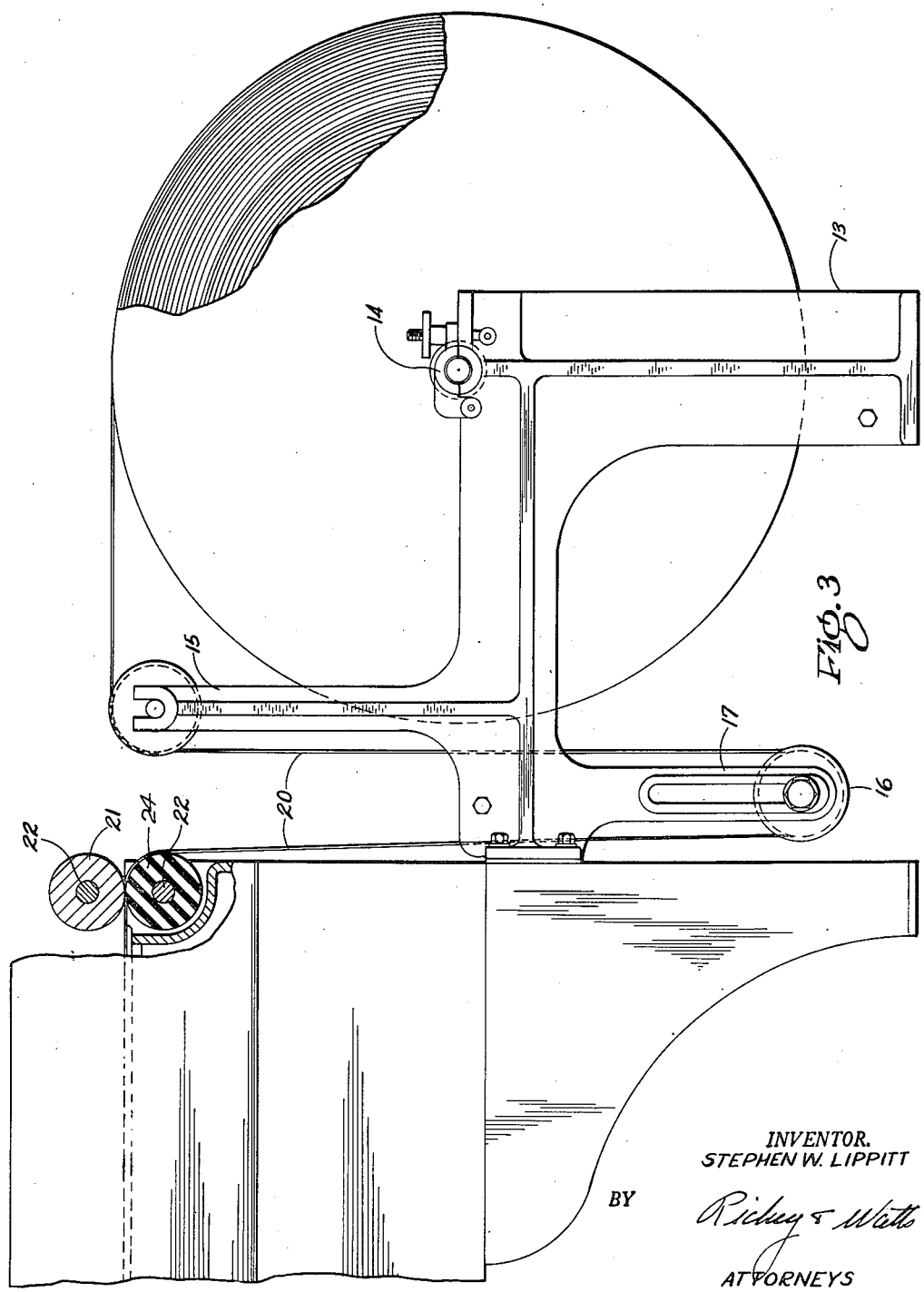

March 4, 1952 S. W. LIPPITT 2,588,132
MACHINE FOR THE MANUFACTURE OF FIBER FOOTWEAR
Filed June 17, 1947 14 Sheets-Sheet 3

INVENTOR.
STEPHEN W. LIPPITT
BY
ATTORNEYS

March 4, 1952   S. W. LIPPITT   2,588,132
MACHINE FOR THE MANUFACTURE OF FIBER FOOTWEAR
Filed June 17, 1947   14 Sheets-Sheet 5

INVENTOR.
STEPHEN W. LIPPITT
BY
ATTORNEYS

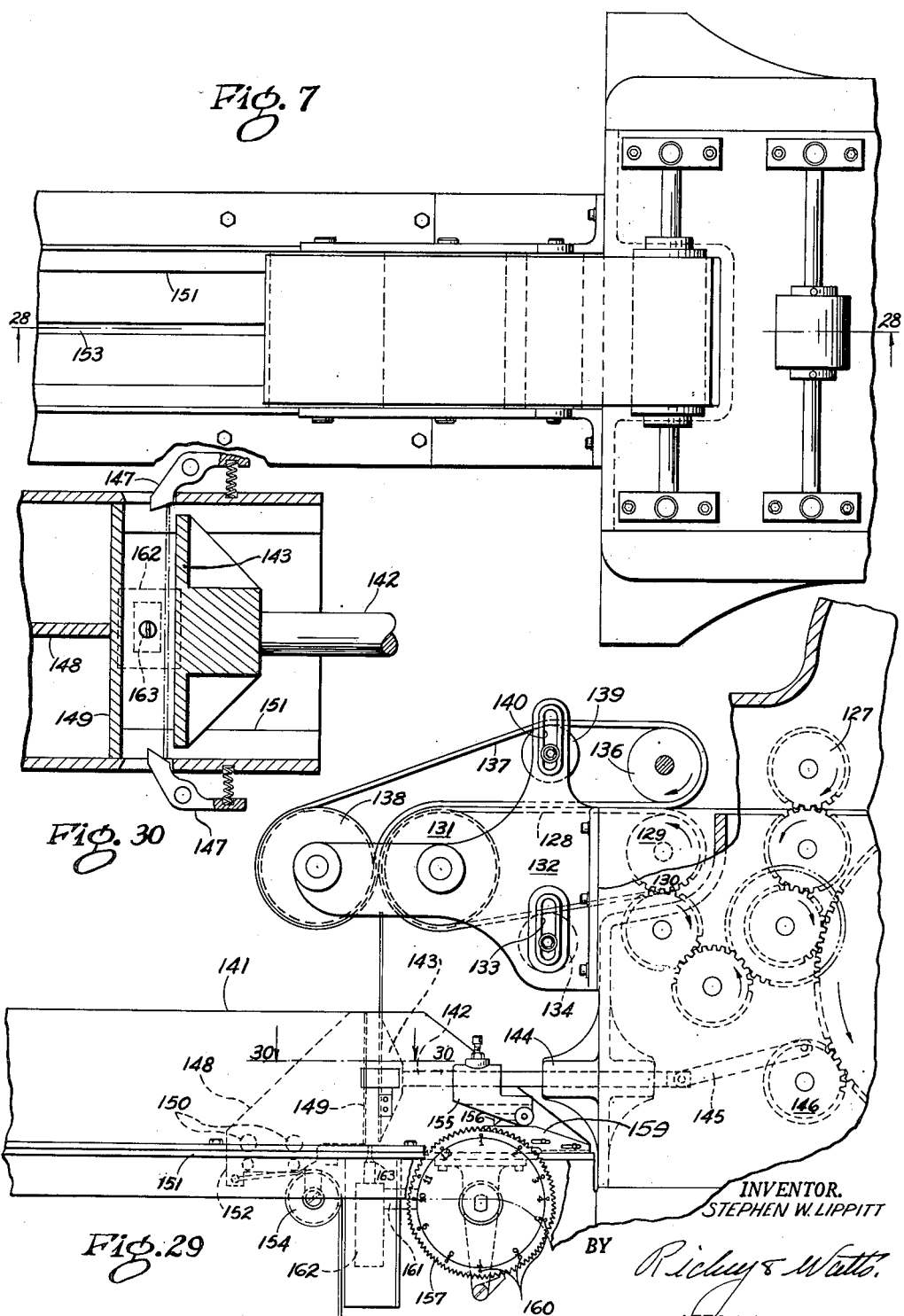

March 4, 1952  S. W. LIPPITT  2,588,132
MACHINE FOR THE MANUFACTURE OF FIBER FOOTWEAR
Filed June 17, 1947  14 Sheets-Sheet 7
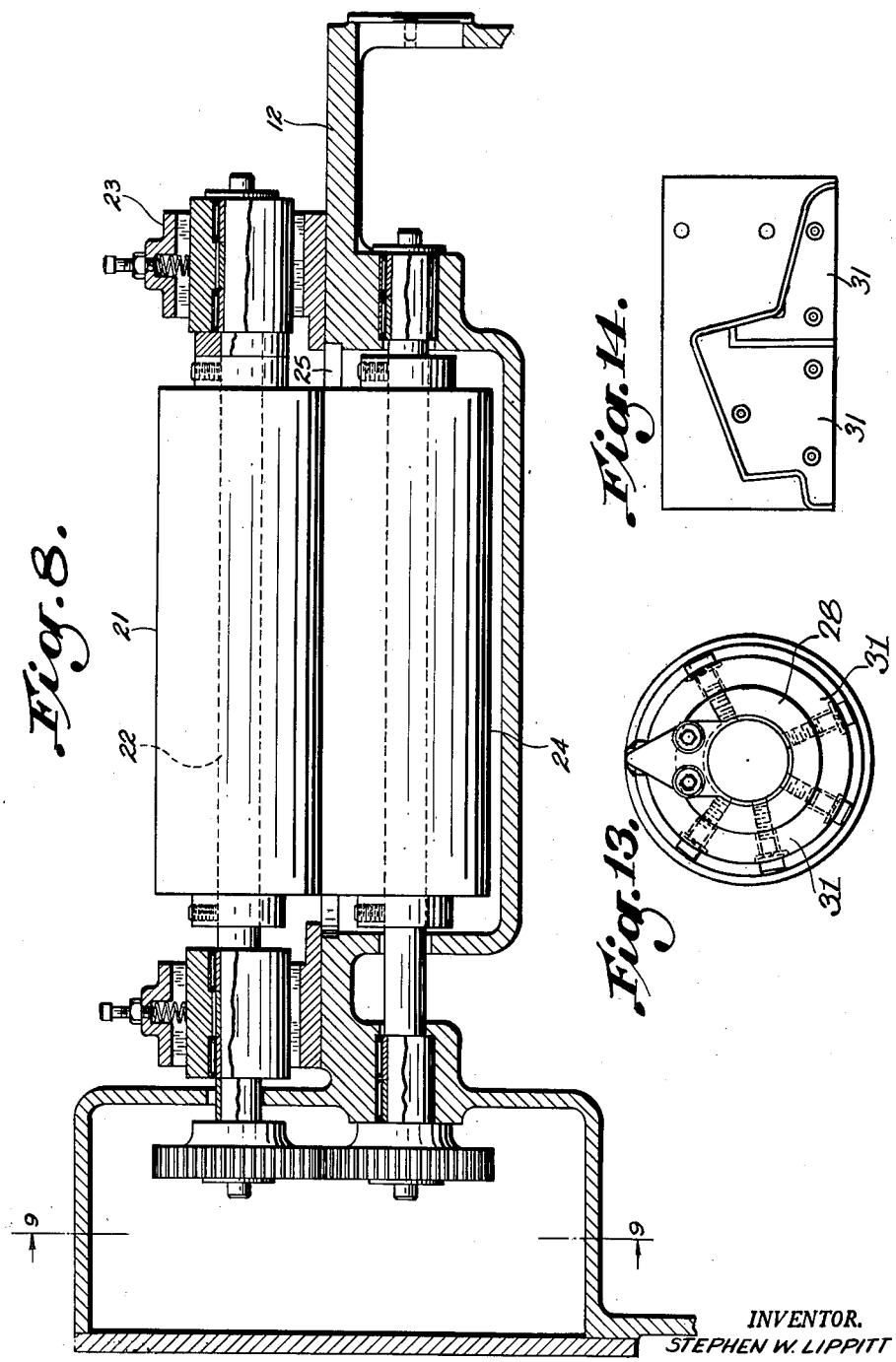
INVENTOR.
STEPHEN W. LIPPITT
BY
ATTORNEYS March 4, 1952 S. W. LIPPITT 2,588,132
MACHINE FOR THE MANUFACTURE OF FIBER FOOTWEAR
Filed June 17, 1947 14 Sheets-Sheet 9
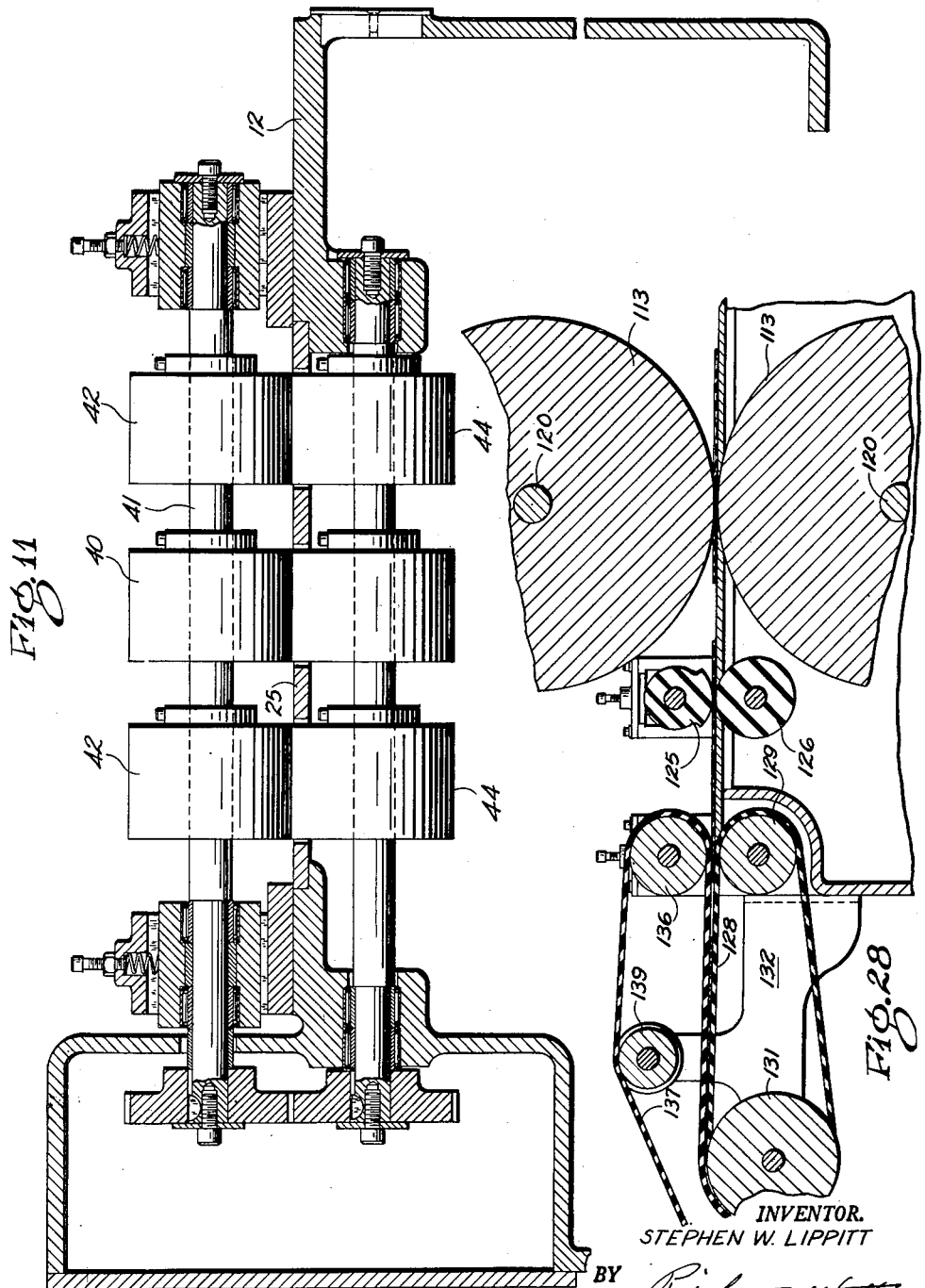
INVENTOR.
STEPHEN W. LIPPITT
BY
ATTORNEYS

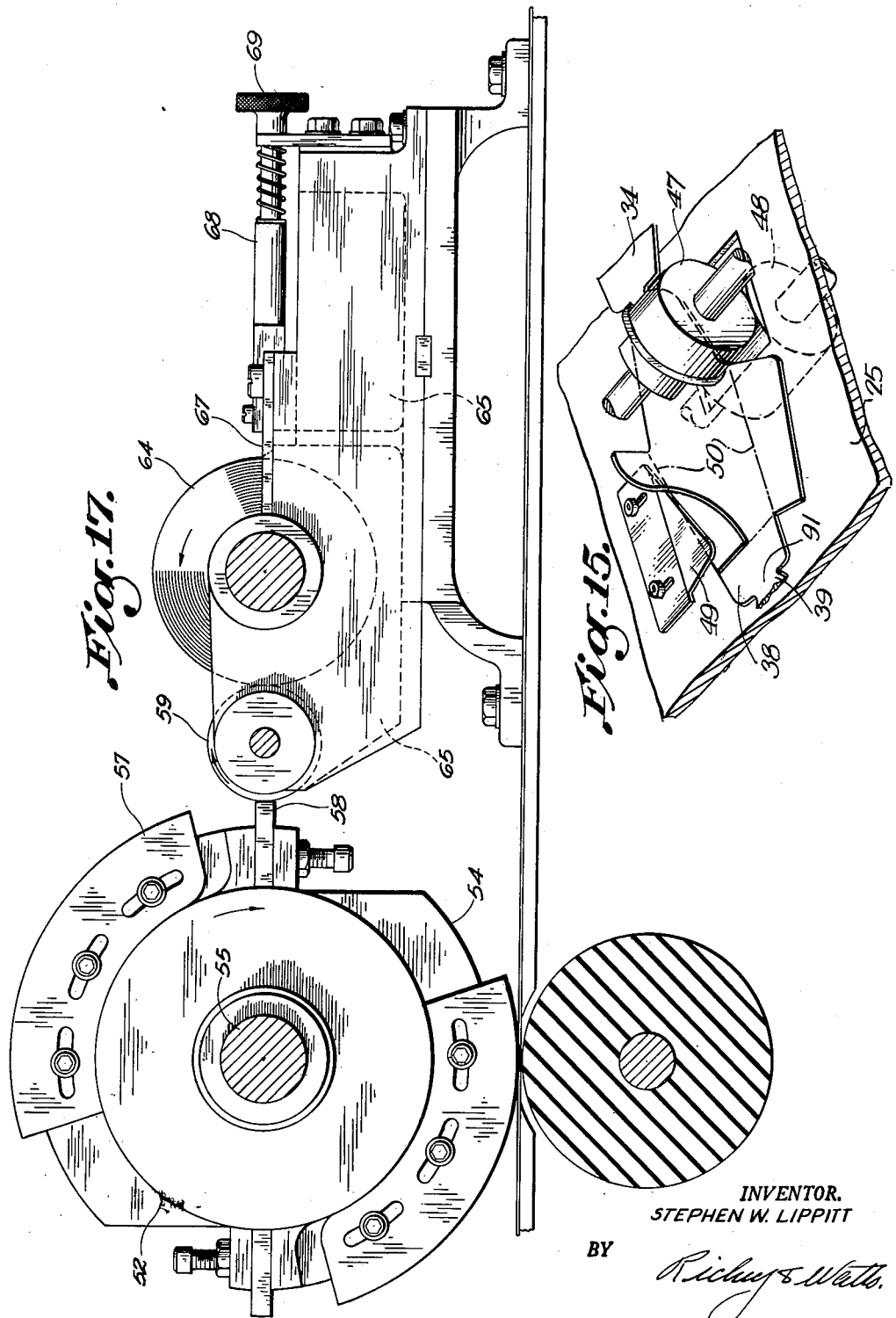

March 4, 1952 S. W. LIPPITT 2,588,132
MACHINE FOR THE MANUFACTURE OF FIBER FOOTWEAR
Filed June 17, 1947 14 Sheets-Sheet 11
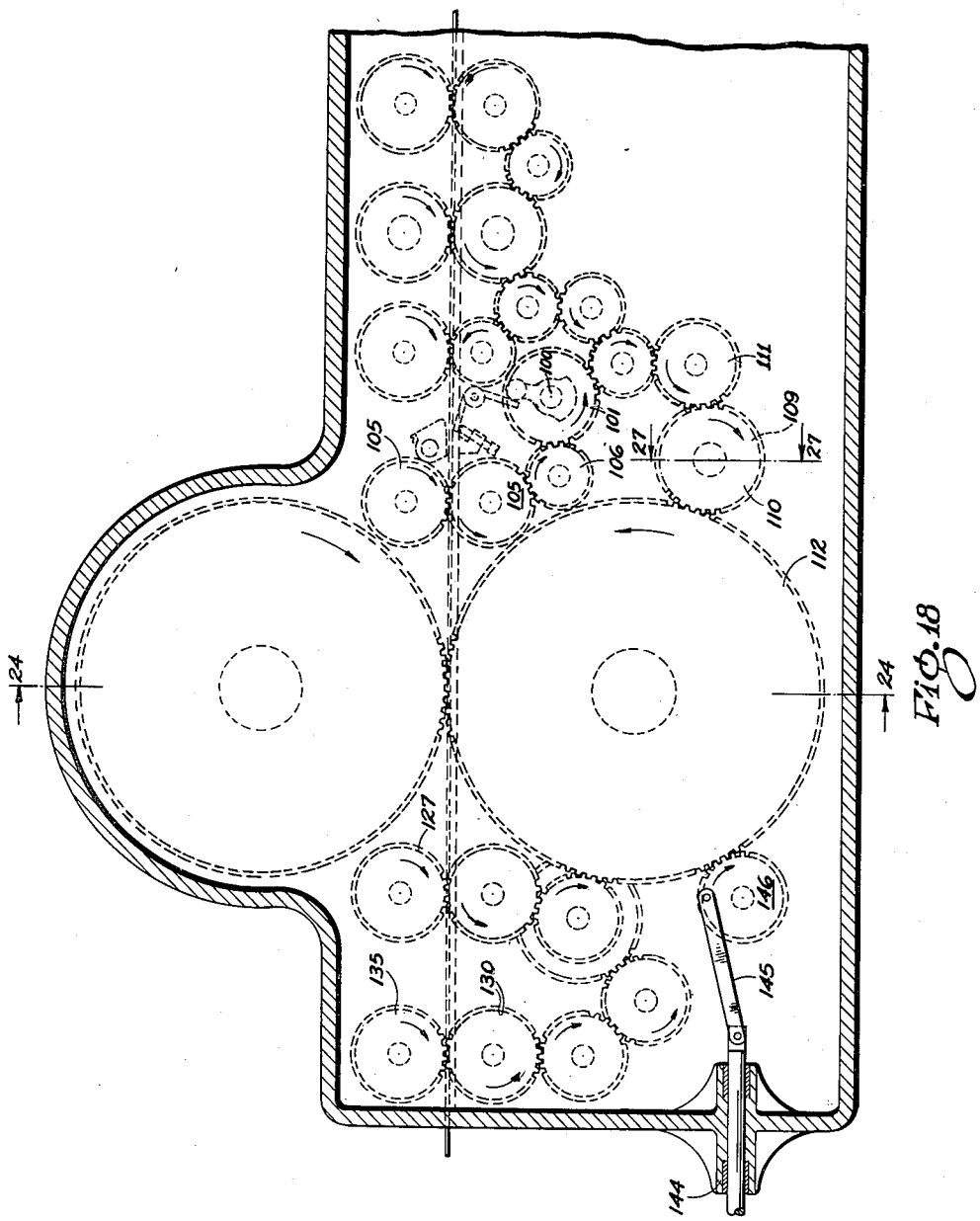
INVENTOR.
STEPHEN W. LIPPITT
BY
ATTORNEYS

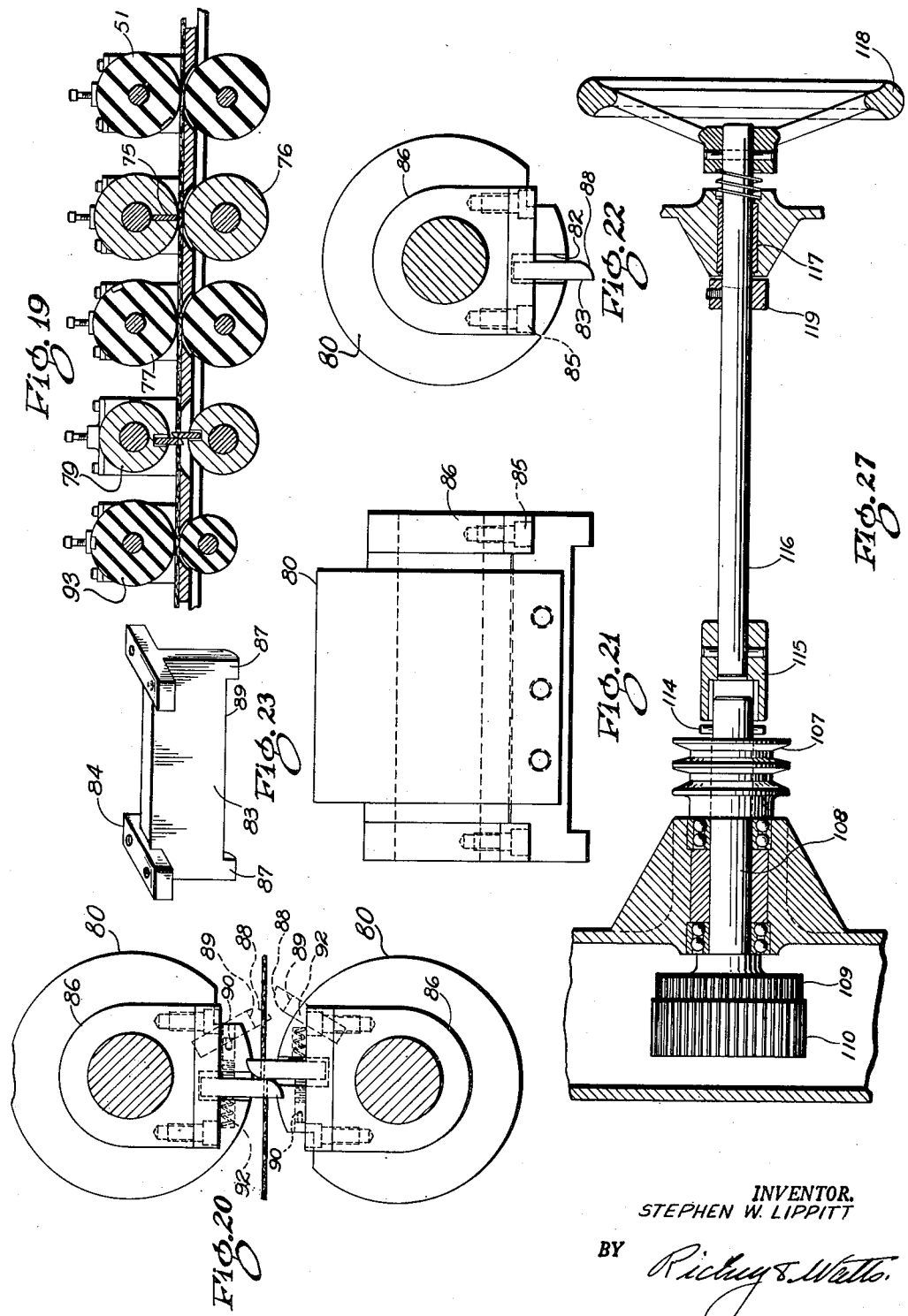

March 4, 1952     S. W. LIPPITT     2,588,132
MACHINE FOR THE MANUFACTURE OF FIBER FOOTWEAR
Filed June 17, 1947     14 Sheets-Sheet 13

INVENTOR.
STEPHEN W. LIPPITT
BY
ATTORNEYS

INVENTOR.
STEPHEN W. LIPPITT

Patented Mar. 4, 1952

2,588,132

UNITED STATES PATENT OFFICE 2,588,132

MACHINE FOR THE MANUFACTURE OF FIBER FOOTWEAR

Stephen W. Lippitt, Lakewood, Ohio, assignor to Sani-Tread Company, Incorporated, Buffalo, N. Y., a corporation of New York Application June 17, 1947, Serial No. 755,214

2 Claims. (Cl. 93—1)

This invention relates to machines for the production of paper sandals of the type used to safeguard the wearer from infectious foot diseases.

In its broadest aspect the invention constitutes a machine which is constructed to cut sandal blanks from a running strip of paper, to progressively fold and cement the blanks into finished form, to crimp or emboss the folded blanks and to adjust the finished sandals into position for packing with certain of a pre-selected number thereof arranged in offset relation.

One of the objects of the invention is to provide an organization of rotary shears for progressively cutting a moving strip of paper into sandal blanks.

Another object of the invention is to fold, gum and seal the portions of the blanks that form the vamps of the sandals, during the translation of the blanks through the machine.

Another object of the invention is to emboss the paper sandals after the final folding operation has been completed.

Another object of the invention is to provide mechanism for the support of the sandals in stacked pre-counted agroupment in order to accommodate the handling thereof with facility and dispatch.

Another object of the invention is to provide a machine for the fabrication of sandals from a roll of paper or similar fibrous material, the fabricating operation being effected by instrumentalities within the machine which perform their operative functions without change or modification during the flight of the material through the machine.

Further objects and advantages of the invention reside in the provision of a machine which is designed for high speed production, which is constructed for full automatic operation, which will facilitate the manufacture of the sandals with minimum scrap loss and which is constructed to withstand continuous high speed operation.

Other objects and advantages more or less ancillary to the foregoing and the manner in which all the various objects are realized will appear in the following description, which, considered in connection with the accompanying drawings, sets forth the preferred embodiment of the invention.

Referring to the drawings:

Fig. 1 is a side elevational view of the improved sandal machine.

Fig. 2 is a plan view thereof;

Fig. 3 is an enlarged side elevational view of the portion of the machine embraced by the bracket III indicated in Fig. 2;

Fig. 7 is a plan view of the portion of the machine embraced by the bracket VII, indicated in Fig. 1;

Fig. 8 is a vertical section through the forward end of the machine, the section being taken on a plane indicated by the line 8—8 in Fig. 4;

Fig. 11 is a vertical section through the second feed roll, the section being taken on a plane indicated by the line 11—11 in Fig. 4;

Fig. 13 is a side elevational view of the circular cutters illustrated in Fig. 4;

Fig. 14 is a developed view thereof;

Fig. 15 is a view in perspective of one of the scoring rolls and the first station of the folding mechanism as illustrated in Fig. 4;

Fig. 16 is a vertical section through the gear cage illustrating the portion of the gear train shown in Fig. 5;

Fig. 17 is a longitudinal section through the gum box and applicator illustrated in Fig. 5, the section being taken on a plane indicated by the line 17—17 therein;

Fig. 18 is a vertical section of the gear cage illustrating the gear train shown in Fig. 6;

Fig. 19 is a vertical section through the central portion of the machine, the section being taken on a plane indicated by the line 19—19 in Fig. 6;

Fig. 20 is a vertical section through the flying shear for separating the heel and toe sections of the blanks, the section being taken on a plane indicated by the line 20—20 in Fig. 6;

Fig. 21 is a front elevation of one of the shear elements shown in Fig. 20;

Fig. 22 is an end elevational view thereof;

Fig. 23 is a view in perspective of one of the shear blades;

Fig. 27 is a vertical section through the power input gear and hand operating mechanism, the section being taken on a plane indicated by the line 27—27 in Fig. 18;

Fig. 28 is a longitudinal section through the sandal discharge mechanism shown in Fig. 7, the section being taken on a plane indicated by the line 28—28 in Fig. 7;

Fig. 29 is a side elevational view, shown upon an enlarged scale, of the sandal counting mechanism shown in Fig. 7;

Fig. 30 is a horizontal section taken on the line 30—30 in Fig. 29; and

Figures 4, 9:
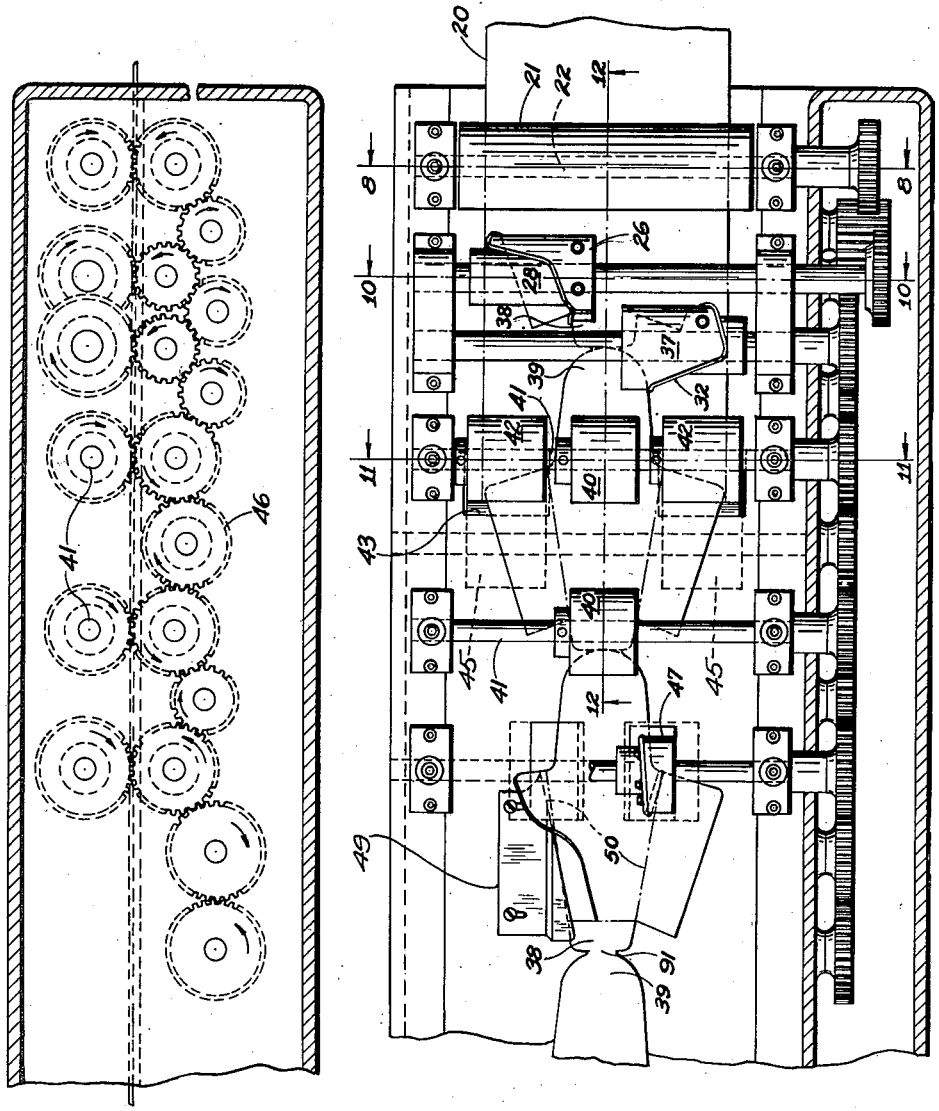
Fig. 4 is a plan view of the portion of the machine embraced by bracket IV, indicated in Fig. 1.
Fig. 9 is a vertical section on the line 9—9 in Fig. 8, illustrating the portion of the gear train showing in Fig. 4.
Figure 5:
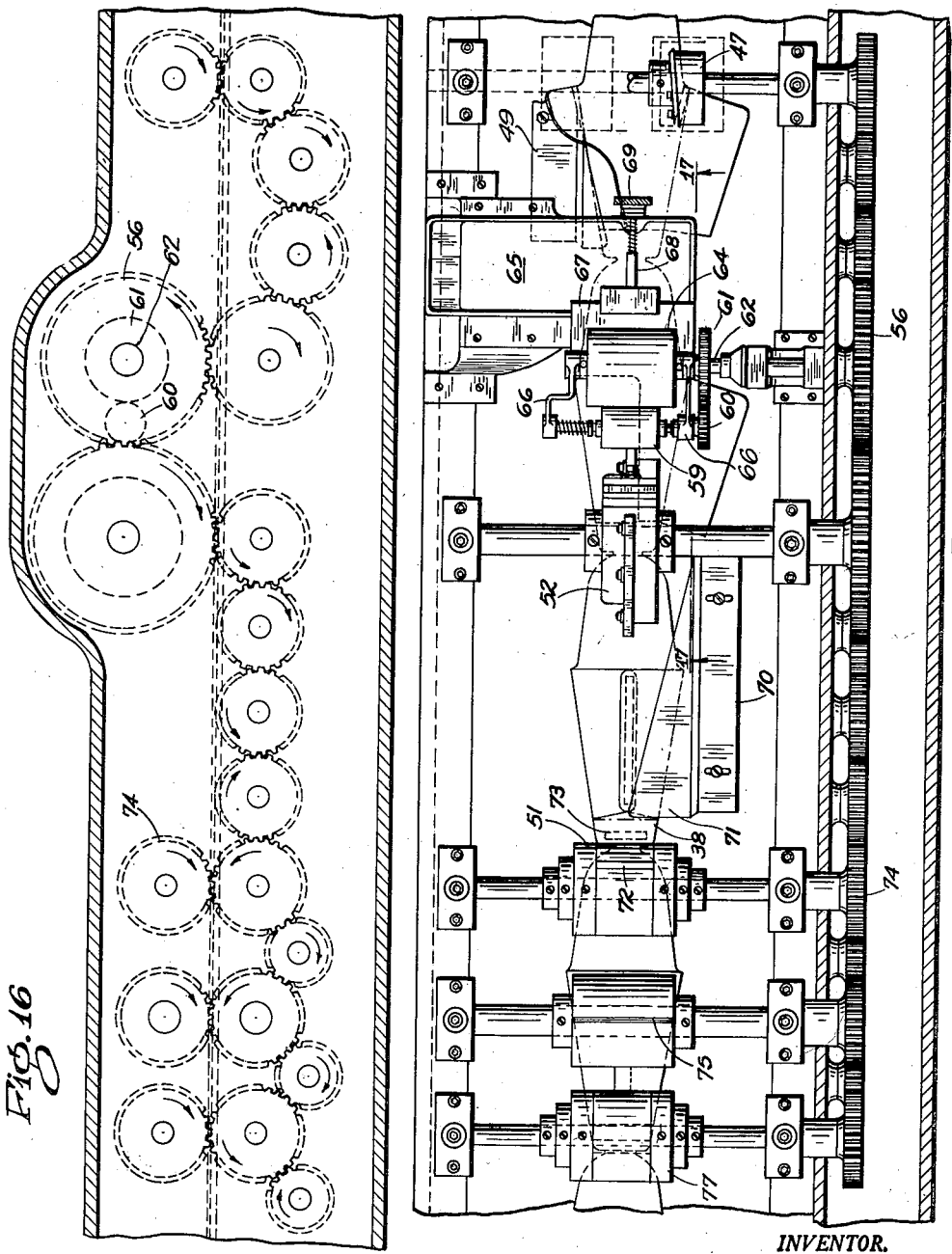
Fig. 5 is a plan view of the portion of the machine embraced by the bracket V, indicated in Fig. 1.
Figure 6:
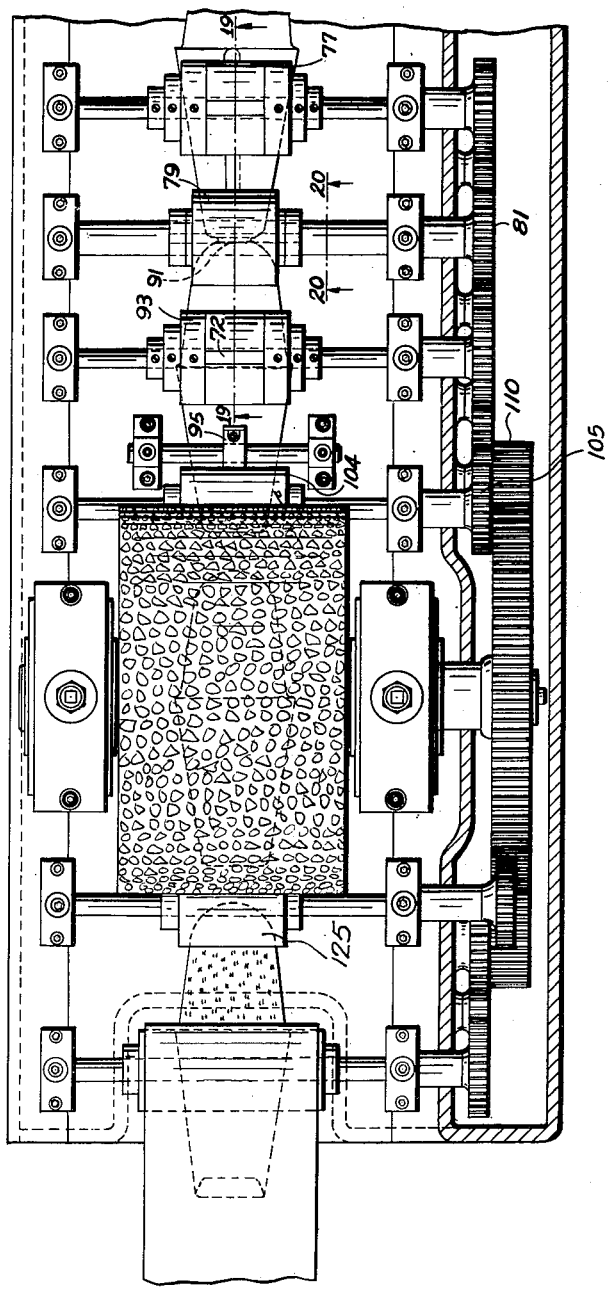
Fig. 6 is a plan view of the portion of the machine embraced by the bracket VI indicated in Fig. 1.
Figure 10:
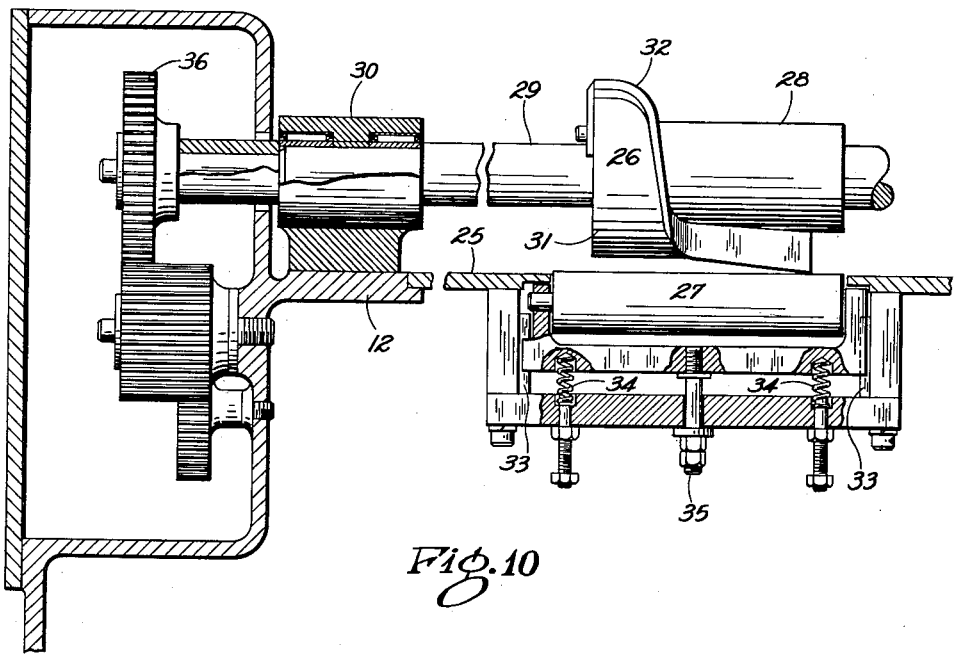
Fig. 10 is a vertical section through the forward cutter roll, the section being taken on a plane indicated by the line 10—10 in Fig. 4.
Figure 12:
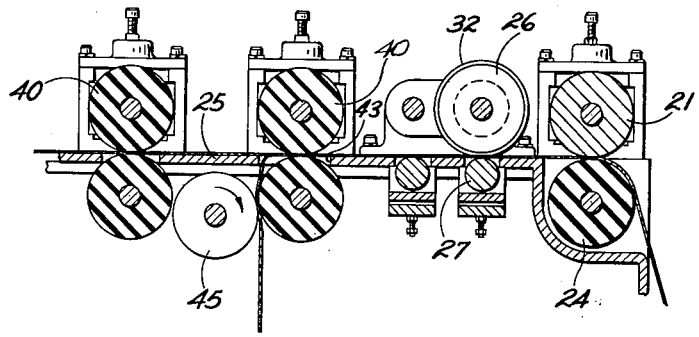
Fig. 12 is a longitudinal section through the forward end of the machine, the section being taken on a plane indicated by the line 12—12 in Fig. 4.
Figure 26:
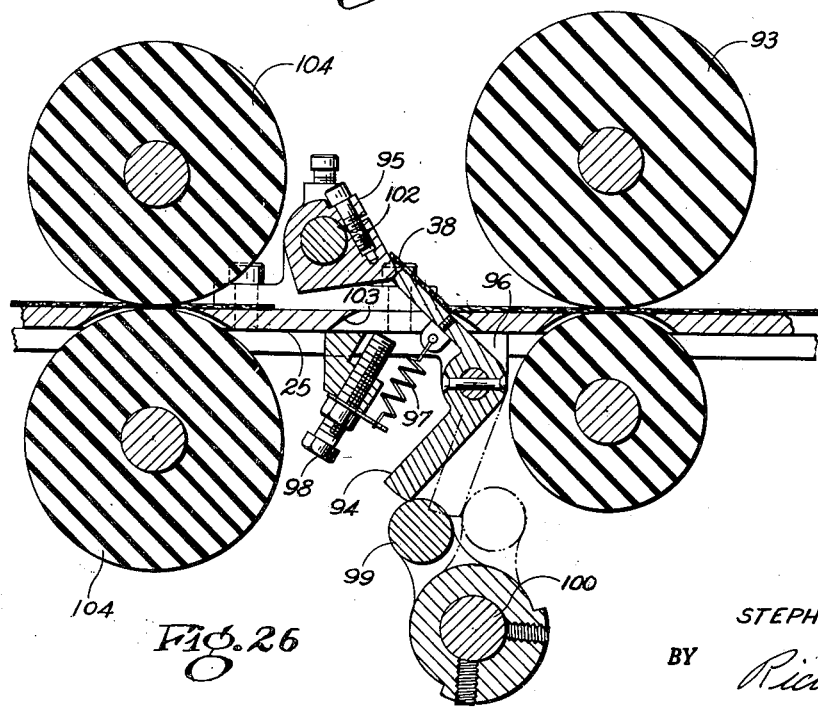
Fig. 26 is a longitudinal section therethrough, the section being taken on a plane indicated by the line 26—26 in Fig. 25.

Referring first to Fig. 1, the machine embodies a rectangular frame 10 supported upon legs 11 and formed with lateral opposed flanges 12 constituting the top or platen of the machine. The forward end of the machine is provided with a frame 13 having articular spindle bearing blocks 14 thereon for the support of a roll of paper, or other fibrous material, from which the sandals are formed. The frame is preferably constructed with stanchions 15 adjacent the inner end thereof, having a roller thereon for guiding the paper over a floating tension roll 16 mounted in arms 17 depending from the frame. The bearing blocks 14 are designed for adjustable frictional engagement with the paper roll arbor 18 in order to restrain free rotation thereof and accommodate control of the tension of the paper fed to the machine. The stock or paper ribbon 20 is drawn from the tensioning mechanism by power driven feed rolls 21 and 24 mounted on shafts 22 journaled in bearings 23 supported on the forward end of the machine. The upper feed roll comprises a solid steel cylinder mounted for variable compressive engagement with its companion roll 24 which is formed of rubber or a similar resilient material (Fig. 12). After the ribbon leaves the feed rolls it is drawn over the ground and polished face of a steel plate 25, inset in ledges machined in the flanges 12 of the side rails of the machine (Figs. 8 and 11). As illustrated with greater clarity in Figs. 4 and 10, the ribbon next passes between a rotary shear 26 and the cylindrical platen 27 therefor, where the ribbon is pierced in configuration of the profile of one side of the sandal blank. The shear comprises a cylindrical core 28 mounted on a shaft 29 journaled in bearings 30 secured upon the upper face of the machine. The core is provided with arcuate segments 31 having bevel edged radial ribs thereon constituting a blade 32 which, as shown in Fig. 14, is formed in delineation of the right hand side of the blank. The platen 27 (Fig. 10) is mounted in a cradle guided for vertical movement through keys 33 in a bracket subtended from the plate 25 of the machine. The cylindrical platen is urged toward the cutting edge of the shear blade 32 by springs 34, excessive upward movement thereof being restrained by a screw 35 which is formed to delimit the movement thereof. The shear is rotatively driven in timed relation with the feed rolls and other mechanism embodied in the machine by a pinion 36 mounted on the shaft 29 which is entrained with the gearing coupled with the input source of power illustrated in Figs. 18 and 27. The ribbon next passes under a second rotary shear 37, similar to the shear 26 but formed to profile the left hand side of the sandal blank. As will be seen in Fig. 4, the cutting blades 32 are formed to leave the toe tab 38 of the blank united with the end of the heel section 39 of the sole, hence as the ribbon is advanced through the machine translation of the fabricated chain of blanks is effected by narrow center rolls 40 mounted on shafts 41 having gears thereon which are intermeshed with the gears entrained with the power input drive pulley. The forward shaft 41 is provided with narrow side rolls 42 mounted above slots 43 in the plate and compressively engaged with similar rolls 44 subtended from the lower face of the top of the machine (Fig. 12). The rolls 44 are engaged with a cylinder 45 which is driven in counter rotation thereto through a gear 46 (Fig. 9) in the gear train. The rolls 42 and 44 are slightly less in width than the severed marginal edges of the ribbon; thus, as will be seen in Fig. 12, the scrap or side portions of the material impinged between the rolls 42 and 44 are deflected by the cylinder 45 through the slots 43 and lead from the machine. As the chain of blanks is advanced by the second feed roll 40 and its companion roller, it will pass under a pair of helical scoring drums 47 which are driven by gears held in timed relation to the movement of the blanks to effect the entry of the leading edge of the helix at the base of the toe tab and the departure of the trailing edge of the helix from the wings of the blank adjacent the rear inner corners thereof. The scoring drums 47 (Fig. 15) are compressively engaged with metallic cylinders 48, the pressure thereon being regulated to cause the upward inclination of the wings after the scoring blades pass therethrough. As the blanks leave the drums 47 the forward edge of the right hand wing of the blank is drawn into contact with the outer edge and lower face of the tapered plate 49 which is disposed above the face of the plate 25 a requisite height, to cause the wing to ride thereunder and thus fold the material down upon the sole along the scored line 50 (Figs. 4 and 15). The next set of feed rolls 51 (Fig. 5), which are driven by a pinion entrained with the source of power, draws the chain of blanks under the gum applicator 52 where an adhesive is applied to the top of the folded wing of the blank and the toe tab 38. The applicator comprises a wheel 54 mounted on a shaft 55 driven through gears 56 designed to rotate in timed relation with the movement of the blanks so that each pair of applicator shoes 57 and 58 (Fig. 17) mounted on the wheel will contact successive blanks in the chain and deposit rectangular areas of the adhesive on the wing and toe portions thereof. The shoes 57 and 58 are preferably made of bronze and are charged by a rubber feed roll 59, rotatively driven through a pinion 60 coupled with a gear 61 (Figs. 5 and 16) on a shaft 62 which supports the gear 56 connected in the gear train from the source of power. The gear 61 drives a drum 64 immersed in the adhesive contained in a reservoir 65 which is mounted on the outer edge of the upper face of the machine. The inner end of the reservoir is spaced above the folding mechanism in order to facilitate the free translation of the blanks thereunder. The drum 64 is urged against the feed roll 59 by spring loaded yokes 66, journaled on the drum shaft and the rearward face of the drum is provided with a wiper plate 67 mounted for adjustment toward and away from the axis of the drum by a spring pressed rod 68 retractable by a nut 69. A rubber backing roll is mounted subjacent the wheel 54 to support the sandal during the gumming operation. As the strip of sandal blanks leaves the gum applicator, the forward edge of the left wing of the blank is engaged with a folder plate 70 similar in form to the plate 49, though formed with a somewhat wider flange 71 in order to assure the full overlapped relation of the wing with the subjacent folded and gummed portion of the blank. The feed roll 51 is formed with a recess 72 in the face thereof, which is proportioned to span the gummed area 73 on the toe of the blank as the sandal passes thereunder. The timed relation between the roll 51 and the movement of the sandal blank is controlled through a pinion 74 on the feed roll shaft and the intermediate gear train coupled with the applicator drive gear 56. The blank next passes between a toe tab scoring blade 75 (Figs. 5 and 19) and the backing roll 76 therefor. The blade comprises a dull beveled plate mounted in a drum which is rotated through the gear train at a speed which will cause the blade to contact the inner end of the tab adjacent the junction thereof with the inner forward corners of the wings as the blank passes thereunder. The backing roll 76 is made of steel to assure the requisite depth of indentation of the paper. The blank next passes between a second set of feed rolls 77 similar in every respect to the feed roll 51 including the driving connection with the gear train. After the blank leaves the roll 77, it passes to the toe cut-off shear 79, which, as will be seen in Figs. 20, 21 and 22, comprises a pair of cylinders 80, driven by pinions 81 intermeshed in the gear train and formed with clearance slots 82 therein for the reception of shear blades 83. The blades (Fig. 23) are generally of rectangular form, having transversely disposed arms 84 on the inner ends thereof, which are drilled for the reception of cap screws 85 secured upon flattened faces of collars 86 loosely mounted upon the drive shafts for the cylinders. The outer corners of the blades 83 are provided with lugs 87 having the opposed faces 88 thereof rounded for rolling engagement over each other. The faces 89 of the blades intermediate the lugs are ground normal to the body thereof and are disposed, upon assembly, in slight overlapped relation. The cylinders 80 are machined for the reception of springs urging the blades against set screws 90 which are adjusted in assembly to maintain the overlapping edges of the blades in compressive engagement. In operation, when a sandal blank enters the opening between the cylinders 80 the shear blades are disposed in remote relation to the tie strip 91 that unites the blanks; when, however, the sandal reaches the point in which the heel 39 thereof falls in a plane through the vertical axis of the cylinders, the blades, due to the rotational speed of the cylinders, will be dosposed in their shearing position, i. e., in the overlapped parallel relation shown in Fig. 20. The blades are mounted on the collars 86 which are free to move relative to the cylinders within the limits provided by the set screws 90 and opposing springs 92. As the blades in the respective cylinders approach each other, they are biased forwardly through the action of the springs, but initial engagement thereof is effected by impingement of the rounded faces 88 of the lugs 87, which overcomes the effort of the springs, rocks the blades into aligned relation, and effects a sliding action of the blades one upon the other, as the contiguous faces thereof move into parallel relation. The cutting edges 89 of the blades pass each other as the tie strip 91 is brought into registration therewith. The severed sandal is held in alignment with the medial axis of the machine and advanced therethrough by a feed roll 93 which, like the roll 51, is provided with a recess 72 disposed during the rotative cycle of the roll to escape the gummed area 73 on the toe of the blank. The roll 93 is driven by a pinion entrained in the gear set from the source of power. The toe tab 38 is next folded down upon the sandal-upper by the combined action of a bell crank 94 and a deflector block 95, illustrated in Fig. 26. The bell crank is mounted in a bracket 96 subtended from the plate 25 and normally urged downwardly by a spring 97 which is retained by an arm supported by a screw 98 provided to facilitate angular adjustment of the bell crank. The bell crank is actuated by a pawl 99 mounted on a shaft 100 having a pinion 101 thereon (Fig. 18) which is entrained with the drive gearing. The deflector block is generally of triangular cross section and is mounted for angular adjustment upon a rod 102 secured in brackets on the upper face of the machine. The plate 25 is machined with an opening 103 in the face thereof, to accommodate the oscillatory movement of the bell crank. The translation of the sandal and rotative movement of the pawl 99 are timed so that the toe tab 38 will be disposed over the opening 103 coincident with the actuation of the pawl. The dwell of the pawl upon the lower arm of the bell crank is of requisite duration relative to the rate of movement of the sandal to cause the toe tab 38 to override the upper arm of the bell crank and surmount the inclined face of the deflector block 95. As the bell crank is released by the pawl, the spring 97 will effect the return thereof with the upper arm of the crank below the face of the plate 25. Continued movement of the sandal will cause the tab to negotiate the inclined face of the block 95 until the scored portion of the tab has passed thereunder, whereupon the lower face of the tab will be brought into engagement with the lower inclined face of the block, which will further bias the tab toward the body of the sandal. The folded tab is forced into intimate engagement with the upper face of the sandal by pressure rolls 104 which effect the seated relation between the gummed areas of the tab and the contiguous area of the sandal-upper. The rolls are driven by pinions 105 through an idler 106 coupled with the gear 101. The source of power is applied through a pulley 107 mounted on a shaft 108 having gears 109 and 110 thereon (Figs. 18 and 27). The gear 109 is intermeshed with a pinion 111 constituting the driving element for the gear train illustrated in Figs. 18, 16 and 9, while the gear 110 is intermeshed with the drive gear 112 for the embossing rolls 113. The inner end of the shaft 108 protrudes beyond the drive pulley and is provided with a cross pin 114, designed for engagement with a clutch 115 mounted on a shaft 116 supported for sliding movement in a bearing 117 in the frame of the machine. The outer end of the shaft 116 has a hand wheel 118 mounted thereon and a spring, normally urging the clutch 115 in disengaged relation with the pin 114, is disposed between the bearing 117 and the hub of the hand wheel. Outward movement of the clutch is restrained by a collar 119 clamped upon the shaft. The hand wheel is provided to facilitate "inching" of the gearing during adjustment of the cutters or other mechanisms in the machine and during the initial setup thereof.

Figure 24:
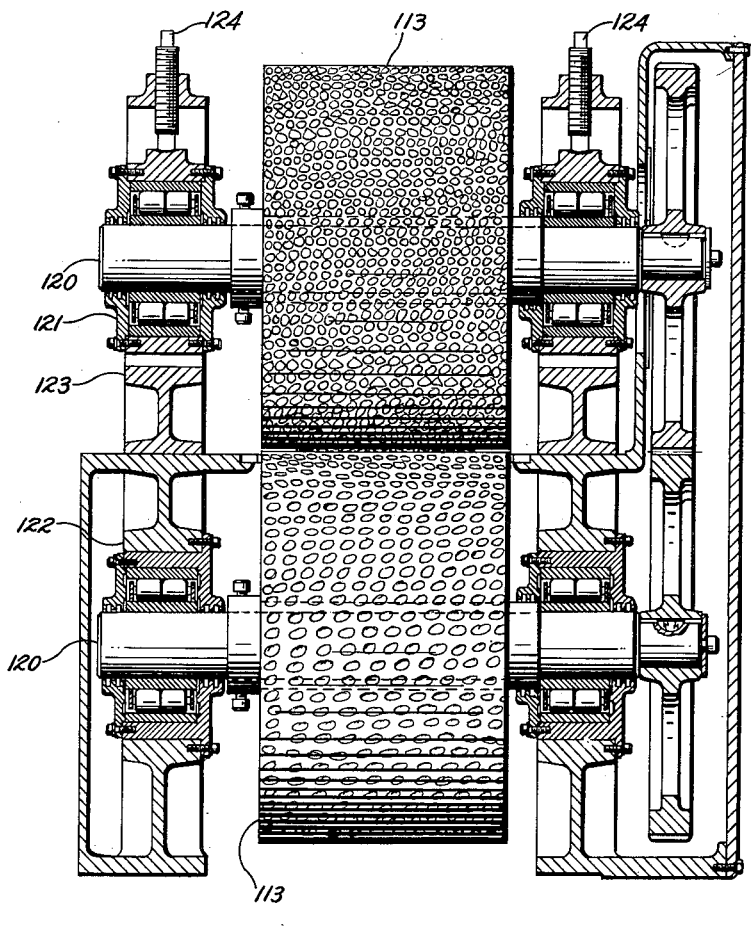
Fig. 24 is a vertical section through the crimping rolls shown in Fig. 6, the section being taken on a plane indicated by the line 24—24 in Fig. 18.
Figure 31:
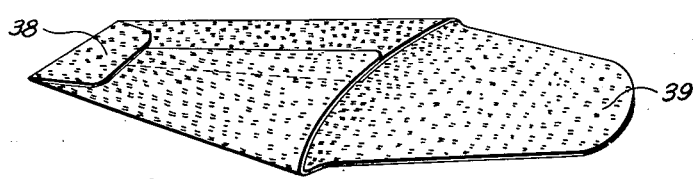
Fig. 31 is a view in perspective of the sandal formed by the machine.
Figure 25:
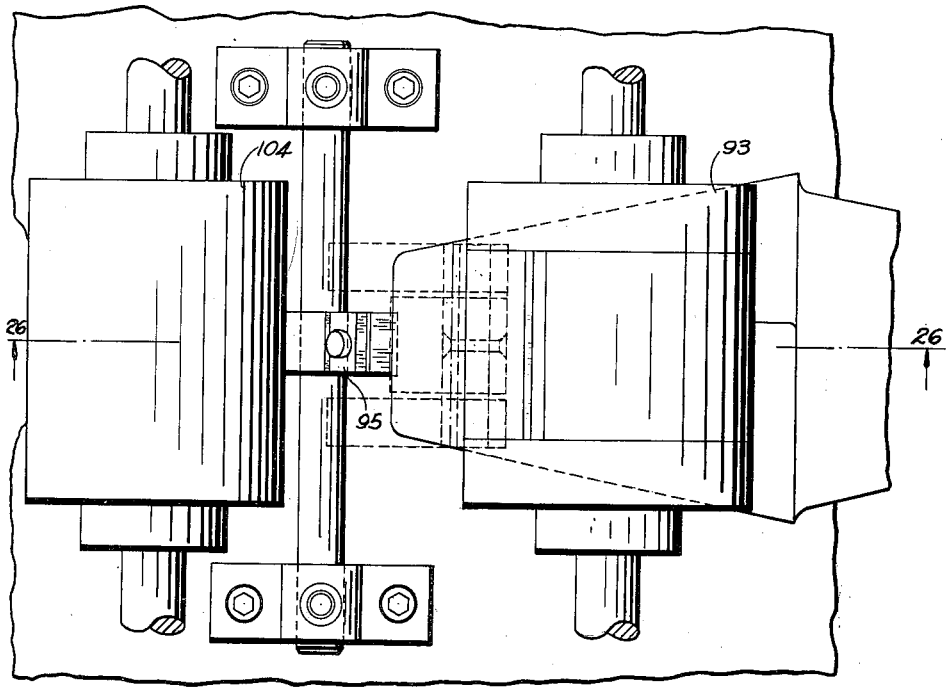
Fig. 25 is a plan view of the toe folding mechanism shown in Fig. 6.

The embossing rolls 113 are mounted on shafts 120 journaled in anti-friction bearings 121 (Fig. 24) seated in bosses 122 in the frame and brackets 123 on the upper face thereof. The face of one of the rolls is formed with a design in low relief, and the same design is repeated intaglio in the mating roll. The design is preferably fashioned in simulation of pebbled leather, though obviously a pattern of any desired configuration may be employed. Portions of the rolls may also be engraved to produce embossed medallions, advertising legends, or similar indicia. The bearings for the upper roll are constructed for the support of jack screws 124 to accommodate control of the pressure applied upon sandals as they pass between the rolls. As the sandals leave the embossing rolls, they are engaged by a cam 125 (Fig. 28) operable in connection with a cylindrical backing drum 126 mounted below the cam and disposed for compressive engagement with the crest thereof. The cam is driven by a gear 127 meshed with a similar gear which in turn is entrained with the embossing roll gearing. The cam is positioned so that the toe of the sandal will pass between the drum 126 and the relieved portion of the cam before the heel is released from the embossing rolls. Coincident with the release of the sandal, however, and befor engagement of any portion thereof with the anterior discharge unit, the peak of the cam will strike the sandal, the impetus impelling it with projectile force to a conveyor leading to the delivery rack.

The conveyor comprises a continuous belt 128 (Figs. 28 and 29) supported by a pulley 129 driven by a pinion 130 entrained with the gears, coupled with the driver 110 (Fig. 18). The forward end of the belt is supported by a second pulley 131 mounted in a bracket 132 secured on the end wall of the machine. The bracket is formed with slots 133 therein constituting bearings for the spindle of a take-up idler pulley 134 supporting a belt 128. The pinion 130 is intermeshed with a gear 135 for driving a pulley 136. The forward end of the belt 137 is carried by a pulley 138, mounted with the axis thereof in a horizontal plane common to that of the pulley 131, one side of the belt being disposed to override the contiguous face of the belt 128. A take-up pulley 139 is provided for the second belt 137, the spindle for the pulley being journaled in a slot 140 in the bracket 132. The flight of the two belts is unidirectional; thus, the sandals engaged between the contiguous faces thereof will be ejected at the point of separation of the belts, i. e., the common horizontal line of tangency of the pulleys 131 and 138. As the sandals drop, toe first, from the conveyor belts, they are received in a rack or trough 141 subjacent the belts and disposed in parallel relation therewith. The inner end of the trough is provided with a ram 142 having a plate 143 affixed thereto, which is of the general configuration of the sandal, though slightly smaller in width and greater in height. The ram is supported in a bearing 144 in the end of the machine and is reciprocated by a link 145 pivoted thereon and to the face of a pinion 146 intermeshed with the lower gear 112 for the embossing roll 113. The trough 141 is formed with openings in the central portion of the side walls thereof, for the reception of spring loaded latches 147 adapted to engage and hold the sandals in spaced relation with the plate 143 upon the return movement thereof in its reciprocative cycle. The trough is further provided with a slide 148 embodying a vertical wall 149 constituting a backing plate for the sandals pressed against the face thereof. The slide is mounted on rollers 150 engaged with rail 151 mounted in the trough and disposed throughout the length thereof. The outer end of the slide is formed with an ear 152 depending through a slot 153 in the base of the trough which supports a cable passed over a pulley 154 and provided with weights (not shown) balanced to urge the slide towards the ram plate 143. In operation when the sandals drop from the belts into the trough, the plate 143 is disposed in its retracted position, and the sandal delivered in the preceding cycle is held in spaced relation with the plate by the latches 147. Thereafter, but before another sandal reaches the trough, the plate 143 will move forwardly beyond the latches 147, thus forcing the overhanging edges of the sandal into locked relation therewith. As the operative cycle of the ram is repeated, the slide 148 and additive sandals will be forced progressively outward since the driving effort of the ram is designed to outweigh the frictional load of the slide, the stack of sandals and counterweights.

The timed relation of the intergeared elements in the machine will sustain the delivery of the sandals to the trough and the movement of the ram in synchronous relation.

The ram is provided with a bracket 155 for the support of a spring-loaded pawl 156 which engages a rachet wheel 157 mounted for rotative movement on the frame of the trough 141. The number of teeth that may be operatively engaged by the pawl may be controlled by a cam plate 159 which is mounted for horizontal adjustment on the trough frame 141. The cam comprises a vertical plate disposed in the plane of the rachet and mounted for horizontal adjustment toward and away from the circumferential face of the adjacent portion thereof. The upper edge of the plate is horizontal and slightly above the top of the rachet, the end thereof adjacent the rachet being inclined downwardly toward the teeth. In operation the pawl rides over the top of the plate during the outward movement of the ram until it falls from the end thereof and engages the preselected tooth of the rachet wheel. Continued movement of the ram will effect further translation of the pawl and the consequent rotation of the rachet wheel. As the ram returns the pawl overrides the rachet teeth until it reaches the inclined end of the cam plate whereupon it is elevated and rides over the straight surface thereof. It will be recognized that adjustments of the plate toward or away from the vertical center line of the rachet will cause the pawl to fall into the desired notch between the teeth in the rachet wheel and thus facilitate the preselection of the tooth to be engaged and the consequent degree of rotation of the rachet wheel. The face of the rachet wheel is drilled for the reception of pins 160 which engage a switch 161 coupled in an electric circuit to a solenoid 162 disposed below and supported by the trough 141. The armature 163 of the solenoid is configured for engagement with the toe of the sandal and is mounted for vertical reciprocative movement within an opening in the base of the trough, slightly forward the plate 143 when the ram is in its retracted position. The openings in the rachet wheel for the pins 160 are arranged in equi-spaced intervals between a given number of the rachet teeth, and are mounted for ready removal so that the solenoid may be actuated at will within any predetermined number of reciprocative cycles of the ram. If, for example, the rachet is cut with one hundred teeth and one pin is inserted in the wheel, an electrical contact will be made as the pin passes the switch 161 and the solenoid will elevate the sandal engaged thereby to indicate to the shipping clerk that one hundred sandals are included between the displaced units. If, however, two pins are inserted in diametric opposition to each other, fifty sandals will be counted and similarly, other subdivisions of the rachet wheel pin centers may be made to accommodate the count to the requirements of the shipping order.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A machine for blanking and forming paper sandals comprising a pair of rotary shears disposed in staggered relation for successively cutting the side edges and portions of the ends of sandal blanks from a moving strip of paper, a plate for folding a side of the blank constituting a portion of the sandal upper as the fabricated blanks pass thereby, an adhesive applicator adjacent thereto for gumming the folded upper and an end portion of the blank constituting the toe of the upper, a plate for folding the other side of the blank adjacent said adhesive applicator, a rotary shear adjacent the last named plate for cutting the end portions of contiguous blanks, mechanism adjacent thereto for folding a severed toe portion of the blank, and rolls having an all-over design thereon adjacent the folding mechanism for embossing the paper sandal thus formed.

2. A paper sandal machine comprising a stand, feed rolls thereon, a rotary shear for cutting one side edge of a paper blank, a second rotary shear spaced therefrom for cutting the opposite side edge of the blank, a mechanism for folding one side edge of the blank, a second folding mechanism spaced therefrom for folding the opposite side edge of the blank, a gum roll intermediate said folding mechanisms, a rotary shear for cutting the ends of the blank, and a third folding mechanism for turning a severed end of the blank upon other of the folded portions thereof.

STEPHEN W. LIPPITT.

REFERENCES CITED

The following references are of record in the file of this patent:

UNITED STATES PATENTS

| Number | Name | Date |
|---|---|---|
| 527,521 | Crowell | Oct. 16, 1894 |
| 839,747 | Gaynor | Dec. 25, 1906 |
| 1,010,833 | West | Dec. 5, 1911 |
| 1,025,457 | Dunfee | May 7, 1912 |
| 1,113,932 | Compton | Oct. 13, 1914 |
| 1,544,578 | Henderson | July 7, 1925 |
| 1,793,163 | Deubner | Feb. 17, 1931 |
| 1,880,662 | Barbieri | Oct. 4, 1932 |
| 1,961,366 | Knowlton | June 5, 1934 |
| 2,145,635 | Rosenberg | Jan. 31, 1939 |
| 2,153,848 | Shea et al. | Apr. 11, 1939 |
| 2,170,864 | Kamborian | Aug. 29, 1939 |
| 2,181,197 | Moritz | Nov. 28, 1939 |
| 2,195,716 | Clark | Apr. 2, 1940 |
| 2,224,668 | Christian | Dec. 10, 1940 |
| 2,354,251 | Fiore | July 25, 1944 |
| 2,559,819 | Hettinger | July 10, 1951 |

FOREIGN PATENTS

| Number | Country | Date |
|---|---|---|
| 201,696 | Germany | Sept. 17, 1908 |